(12) United States Patent
Eck et al.

(10) Patent No.: US 6,547,874 B2
(45) Date of Patent: Apr. 15, 2003

(54) HYDROPHOBICIZING AGENTS FOR HYDROPHOBICIZING GYPSUM-PLASTER-BOUND CONSTRUCTION MATERIALS

(75) Inventors: Herbert Eck, Bad Tölz (DE); Klaus Adler, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 48 days.

(21) Appl. No.: 09/769,918

(22) Filed: Jan. 25, 2001

(65) Prior Publication Data
US 2002/0040666 A1 Apr. 11, 2002

(30) Foreign Application Priority Data
Jan. 27, 2000 (DE) .......................... 100 03 495

(51) Int. Cl.⁷ .......................... C04B 11/00; C04B 24/40
(52) U.S. Cl. ...................... 106/772; 106/778
(58) Field of Search .................. 106/772, 778, 106/823

(56) References Cited

U.S. PATENT DOCUMENTS

| | | |
|---|---|---|
| 3,455,710 A | 7/1969 | Nitzsche et al. |
| 4,643,771 A | 2/1987 | Steinbach et al. |
| 4,851,047 A | 7/1989 | Demlehner et al. |
| 5,641,535 A * | 6/1997 | Eck et al. |
| 6,090,868 A * | 7/2000 | Eck et al. |

FOREIGN PATENT DOCUMENTS

| | | |
|---|---|---|
| DE | 27 40 049 | 3/1978 |
| DE | 37 04 439 | 8/1988 |
| DE | 41 28 424 | 3/1993 |
| DE | 4433864 | 2/1995 |
| DE | 19734255 | 2/1999 |
| DE | 19752659 | 6/1999 |
| EP | 0 171 018 | 2/1986 |
| FR | 1207978 | 11/1958 |
| FR | 1525367 | 4/1967 |
| GB | 1 581 396 | 12/1980 |
| GB | 2062607 | 5/1981 |

* cited by examiner

Primary Examiner—Paul Marcantoni
(74) Attorney, Agent, or Firm—Brooks & Kushman P.C.

(57) ABSTRACT

The invention relates to a hydrophobicizing agent for gypsum-plaster-bound construction materials comprising a substrate based on pulverulent organic or inorganic solids with a BET surface area >5 g/m² and comprising one or more organopolysiloxanes having Si-bonded hydrogen (organohydropolysiloxanes) built up from units of the general formula $H_aSiR^1{}_bO_{(4-a-b)/2}$, where the radicals $R^1$ are identical or different monovalent hydrocarbon or hydrocarbonoxy radicals having from one to 15 carbon atoms, or are hydroxyl groups, with the proviso that at least one Si-bonded hydrogen atom per molecule is present, and a takes values from 0 to 3, and b takes values from 0 to 3.

12 Claims, No Drawings

HYDROPHOBICIZING AGENTS FOR HYDROPHOBICIZING GYPSUM-PLASTER-BOUND CONSTRUCTION MATERIALS

The invention relates to a hydrophobicizing agent for gypsum-plaster-bound construction materials, its use and a process for its preparation.

Gypsum plaster is a construction material available at low cost and in large quantities. Besides the use of gypsum plaster in jointing compositions, gypsum mortars are especially used for internal renders and for coatings. However, due to their sensitivity to water, renders which comprise calcined gypsum as binder are used only for internal renders exposed to the conditions usual for these, but not for high-humidity areas or for external renders. Construction materials based on gypsum plaster have to be adequately hydrophobicized if they are to be used externally or in wet areas. The prior art therefore frequently makes its organosilicon compounds with gypsum plaster compositions to hydrophobicize the same.

DE-A 2740049 (GB-A 1581396) describes a process for preparing a water-repellent gypsum plaster product, in which pulverulent gypsum plaster is mixed with a linear monomethylpolysiloxane in the absence of water. A disadvantage of this process is that a relatively large amount of monomethylpolysiloxane is required for the hydrophobicization, and the usage properties of the resultant pretreated pulverulent gypsum plaster becomes poorer.

It is known from EP-A 171018 (U.S. Pat. No. 4,643,771) that hydrophobicized plaster moldings can be produced by adding a foam prepared from alkylhydropolysiloxanes, surfactant and water to the aqueous plaster mix. A significant disadvantage of this process is that in practice when plasterboard is produced, the amount of plaster mix metered is regulated, inter alia, by varying the amount of foam added. The hydrophobicization of the final product is therefore not uniform.

DE-A 4128424 relates to a process for the hydrophobicization of gypsum plaster compositions, where the alkylhydropolysiloxane used as a hydrophobicizing agent is an oil which is mixed intimately with the water used for mixing, and then the pulverulent gypsum plaster is added. U.S. Pat. No. 3,455,710 discloses that alkylhydropolysiloxanes in the form of their aqueous emulsion can be added to gypsum plaster as a hydrophobicizing agent for the same purpose. The two last-named processes have the disadvantage that the hydrophobicizing agent has to be admixed by, and therefore also metered by, the user. Variations are therefore certain to occur. In addition, when the material is admixed in the form of an aqueous emulsion, consideration has to be given to the relatively high level of hydrogen cleavage with resultant fall-off in the effectiveness of the polysiloxane.

The process described in DE-A 3704439 provides a marked improvement by using the hydrophobicizing agent in the form of a pulverulent product which is obtained in the form of a water-redispersible powder by spray drying a mixture made from water, from alkylhydropolysiloxane and from a water-soluble film-forming polymer having a specific cloud point, for example, polyvinyl alcohol. This powder can then be added to the gypsum plaster in order to hydrophobicize the same. Disadvantages are the not inconsiderable production cost of the powder, and also its unsatisfactory storage stability. This carries with it the risk of a hydrogen explosion or dust explosion prior to incorporation into the pulverulent gypsum plaster, since there is the possibility of hydrogen cleavage.

The object was therefore to develop a hydrophobicizing agent which can be used for gypsum-plaster-bound construction materials and which permits uniform incorporation of the hydrophobicizing agent into the pulverulent gypsum plaster, or into the pulverulent gypsum plaster mixture. In addition, the pulverulent hydrophobicizing agent, both on its own and in the ready-to-use mixture, should have good storage stability and pose a minimal risk of explosion.

The invention provides a hydrophobicizing agent for gypsum-plaster-bound construction materials comprising a substrate based on pulverulent organic or inorganic solids with a BET surface area >5 g/m$^2$ and comprising one or more organopolysiloxanes having Si-bonded hydrogen (organohydropolysiloxanes) and built up from units of the general formula $H_a SiR^1_b O_{(4-a-b)/2}$, where the radicals $R^1$ are identical or different monovalent hydrocarbon or hydrocarbonoxy radicals having from one to 15 carbon atoms, or are hydroxyl groups, with the proviso that at least one Si-bonded hydrogen atom per molecule is present, and a takes values from 0 to 3, and b takes values from 0 to 3.

Suitable substrates from the group of inorganic substrates are silicon dioxide such as silica gel or silica, aluminum oxide, titanium dioxide, silicates and clays. Preference is given to silica and aluminum oxide, particularly preferably aluminum oxide and silica prepared by precipitation using solution chemistry, or pyrogenically by flame hydrolysis. Suitable substrates from the group of organic substrates are starch powders, cellulose powders and polymer powders. Preference is given to polyvinyl chloride powders, in particular suspension PVC powders, polystyrene powders, polyamide powders and polyvinylpyrrolidone powders. Aluminum oxide and silica prepared by precipitation using solution chemistry are most preferred.

Preference is also given, to pulverulent inorganic or organic substrates with a BET surface area of from 20 to 400 m$^2$/g, measured by the BET method to DIN 66131 and DIN 66132. Particular preference is given to substrates which do not promote hydrogen cleavage in the organohydropolysiloxanes, i.e. those whose surface is neutral to slightly acidic, particularly with a pH of from 5.5 to 7.0 (5% strength by weight suspension in water). Particular preference is also given to substrates with good adsorption properties, i.e., liquid uptake >10% by weight, based on the weight of the substrate.

Examples of hydrocarbon radicals having from 1 to 15 carbon atoms as radical $R^1$ are alkyl radicals such as methyl, ethyl, n-propyl, isopropyl, n-butyl, isobutyl, tert-butyl, n-pentyl, isopentyl, tert-pentyl, n-hexyl, n-heptyl, n-octyl, isooctyl or 2,2,4-trimethylpentyl, n-nonyl, n-decyl, n-dodecyl; alkenyl radicals, such as vinyl and allyl; cycloalkyl radicals such as cyclopentyl, cyclohexyl, cycloheptyl and methylcyclohexyl; aryl radicals such as phenyl, naphthyl, anthryl and phenanthryl; alkaryl radicals such as o-, m-, p-tolyl, xylyl and ethylphenyl; aralkyl radicals such as benzyl and alpha- and beta-phenylethyl. Where appropriate, the hydrocarbon radicals having from 1 to 15 carbon atoms may also have halogen substitution. Examples of such cases are fluorine-, chlorine-, bromine- or iodine-substituted alkyl radicals such as 3,3,3-trifluoro-n-propyl, 2,2,2,2',2',2'-hexafluoroisopropyl, heptafluoroisopropyl and haloaryl radicals such as o-, m- and p-chlorophenyl. Examples of hydrocarbonoxy radicals are the abovementioned $C_1-C_{15}$-hydrocarbon radicals bonded to the silicon atom via a bivalent oxygen atom.

Particularly preferred radicals $R^1$ are the unsubstituted $C_1-C_6$-alkyl radicals, in particular methyl, and phenyl. In another preferred embodiment, not more than 5 mol % of the radicals $R^1$, and particularly preferably none of these radicals, are hydrocarbonoxy radicals or hydroxyl groups. The variable a is preferably from 0.01 to 2, in particular from 0.1 to 1, and b is preferably from 1.0 to 2.0, in particular from 1.0 to 1.8. The average viscosity of the organohydropolysiloxanes is not more than 1000 mm$^2$/s, preferably from 5 to 1000 mm$^2$/s, in particular from 5 to 100 mm$^2$/s, in each case at 25° C.

Most preference is given to organohydropolysiloxanes of the general formula $(CH_3)_3SiO(SiHCH_3O)y(Si(CH_3)_2O)_xSi(CH_3)_3$, where x is zero or an integer and y is an integer not less than 3, and y is at least three times x, preferably at least 13 times x, and the sum of x and y is an integer such that the average viscosity of these organohydropolysiloxanes is not more than 1000 mm$^2$/s, in particular from 5 to 100 mm$^2$/s, in each case at 25° C.

The hydrophobicizing agent generally comprises from 20 to 75% by weight of organohydropolysiloxanes, based on the total weight of substrate and organohydropolysiloxane.

To prepare the hydrophobicizing agent, the organohydropolysiloxanes are used in the form of a liquid, preferably without adding solvent. The substrate generally forms an initial charge, and the liquid organohydropolysiloxane is then metered in and is applied to the substrate by mixing with the substrate. The organohydropolysiloxanes are generally applied to the substrates at room temperature, and may be applied in conventional devices suitable for mixing powders. Examples of these which may be mentioned are continuously operating or batchwise-operating ribbon blenders, double-helix mixers, blade mixers, plowshare mixers, fast- or slow-speed paddle mixers, vortex screw mixers, and pan mixers. Mixers with rotating mixing vessels may also be used, for example Rhönrad mixers, tumbling mixers, double-cone mixers and V-blenders. The organohydropolysiloxanes may also be applied to the substrates by spraying the liquid organohydropolysiloxanes onto the pulverulent substrates.

The hydrophobicizing agent is suitable for hydrophobicizing all types of gypsum plaster. The types of gypsum plaster include alpha- and beta-hemihydrate $(CaSO_4 1/2H_2O)$ in the form of calcined gypsum, stucco plaster or modeling plaster. Other common types of gypsum plaster are flooring plaster, Keene's cement, and anhydrite, and also the calcium sulfate produced in flue gas desulfurization.

The gypsum plaster composition may moreover comprise the usual aggregates and additives. Usual aggregates for gypsum mortar are from 1 to 30% by weight of hydrated lime, and also the usual amounts, preferably from 5 to 80% by weight, of inert fillers such as calcium carbonate, dolomite, calcium sulfate and/or quartz sand. All of the % by weight data are based on the total weight of the pulverulent gypsum plaster composition. Examples of additives which improve the usage properties of the gypsum plaster composition or the properties of products manufactured therewith are salts of long-chain fatty acids such as calcium stearate and sodium oleate, silicone buildings-preservation materials, fungicides, fibrous materials, such as cellulose fibers, accelerators such as dipotassium hydrogensulfate and aluminum sulfate, retarders such as proteins and tartrates, plasticizers such as lignin sulfates, adhesion promoters such as starch, and binders, as in water-redispersible polymer powders.

To hydrophobicize the gypsum plaster, the hydrophobicizing agent is mixed with the gypsum plaster in suitable mixers for example in the above-mentioned mixing assemblies suitable for mixtures of powders. Another possible procedure is to mix the hydrophobicizing agent with the additives for modifying gypsum plaster compositions, and then adding the same to the gypsum plaster. For example, the hydrophobicizing agent may be added during the spray drying of aqueous polymer dispersions to prepare water-redispersible polymer powders. A preferred process here is to add the hydrophobicizing agent to the dried polymer powder by continuously metering the hydrophobicizing agent into the spray dryer, where appropriate with other additives such as antiblocking agents and antifoam.

The amount of the hydrophobicizing agent added to the gypsum plaster composition is such that, based on 100 parts by weight of gypsum plaster in the hydrophobicized gypsum plaster composition, from 0.05 to 5 parts by weight, preferably from 0.2 to 2 parts by weight, of organohydropolysiloxane are present.

The gypsum plaster compositions hydrophobicized according to the invention are especially suitable for use as a gypsum mortar for troweling compounds, joint fillers, flowable screeds, jointing compositions or adhesive mortars. Examples of other applications are renders or stucco work specifically in the outdoor sector. Examples of other uses are the production of plasterboard or plaster moldings.

The examples below further illustrate the invention:

General specification for preparing the hydrophobicizing agent:

150 g of substrate formed an initial charge in a double-helix mixer, and 150 g of organohydropolysiloxane were added dropwise within a period of 30 minutes, at room temperature. After stirring had been continued for 10 minutes, the pulverulent composition was drawn off. Compositions 1 and 2 below were prepared.

Composition 1:

The substrate was a pulverulent silica (Sipernat 22) with a BET surface area of 190 m$^2$/g and a pH of 6.3 (5% strength suspension), to which a methylhydropolysiloxane end-blocked with trimethylsiloxy groups and having a viscosity of 20 mm$^2$/s (25° C.) had been applied.

Composition 2:

The substrate was a pulverulent silica (FK 320) with a BET surface area of 170 m$^2$/g and a pH of 6.3 (5% strength suspension), to which a methylhydropolysiloxane end-blocked with trimethylsiloxy groups and having a viscosity of 20 mm$^2$/s (25° C.) had been applied.

The hydrophobicization was tested in the following gypsum mortar mix:

800 parts by weight of gypsum plaster (alabaster modeling plaster)
158.2 parts by weight of $CaCO_3$ (Durcal 65)
30 parts by weight of dispersion powder (Vinnapas LL 5100)
1.0 part by weight of cellulose ether (Culminal C 8031)
0.5 part by weight of starch ether (Amylotex Plus)
10.0 parts by weight of calcium sulfate
0.3 part by weight of retarder (Retardan-P)
520 parts by weight of water

EXAMPLE 1

The gypsum mortar was hydrophobicized with 0.5 part by weight of composition 1.

EXAMPLE 2

The gypsum mortar was hydrophobicized with 0.5 part by weight of composition 2.

COMPARATIVE EXAMPLE 1

The gypsum mortar was not hydrophobicized.

COMPARATIVE EXAMPLE 2 (analogous to DE-A 4128424):

To hydrophobicize the gypsum mortar, 0.25 part by weight of the methylhydropolysiloxane with a viscosity of 20 mm²/s (25° C.) and end-blocked with trimethylsiloxy groups was added to the water used for mixing.

Comparative Example 3 (analogous to U.S. Pat. No. 3,455,710):

To hydrophobicize the gypsum mortar, 0.5 part by weight of a 50% strength aqueous emulsion of the methylhydropolysiloxane with a viscosity of 20 mm²/s (25° C.) and end-blocked with trimethylsilolxy groups was added.

Testing of Hydrophobic Properties:

To test water uptake, a layer of gypsum mortar, 10 mm in thickness, was applied to a concrete panel and dried. A sample tube of Karsten type was placed on the dried layer and consisted of a bell-shaped section (internal diameter 20 mm, height 25 mm, surface sampled 3 cm²) and, attached to this, a calibrated glass tube of length 10 cm with volumetric divisions. Mastic was used to attach the sample tube to the surface to be sampled, the tube was filled with water, and the drop in level (penetration) of the water was measured using the graduations. The test results are given in Table 1.

The results show that adding the organohydropolysiloxane directly into the gypsum mortar achieves only very slight hydrophobicization (Comparative Example 2: 5 ml of water uptake after 25 min), the water uptake here not being significantly better than that for gypsum mortar which has not been hydrophobicized (Comparative Example 1: 5 ml of water uptake after as little as 10 min).

Hydrophobicizing the gypsum mortar with an aqueous emulsion of the organohydropolysiloxane gives better hydrophobicization (Comparative Example 3: 0.5 ml of water uptake after 7 h).

However, when the hydrophobicizing agent of the invention is used (Examples 1, 2), even after 7 hours of waterpenetration time the water uptake measured is only 0.1 ml. The hydrophobicization has been markedly improved over the procedure known from the prior art.

TABLE 1

| Water Uptake [ml] | 10 min | 25 min | 1 h | 2 h | 3 h | 7 h |
| --- | --- | --- | --- | --- | --- | --- |
| Example 1 | 0 | 0 | 0.1 | 0.1 | 0.1 | 0.1 |
| Example 2 | 0 | 0 | 0.1 | 0.1 | 0.1 | 0.1 |
| Comparative Example 1 | >5 | | | | | |
| Comparative Example 2 | | >5 | | | | |
| Comparative Example 3 | 0 | 0 | 0.1 | 0.3 | 0.4 | 0.5 |

What is claimed is:

1. A gypsum plaster-containing composition, comprising, per 100 parts gypsum plaster, a pulverulent hydrophobicizing agent sufficient to supply from 0.05 to 5 parts by weight of an organohydropolysiloxane, said pulverulent hydrophobicizing agent consisting essentially of at least one organohydropolysiloxane containing units of the formula $$H_aSiR^1{}_bO_{(4-a-b)/2},$$

wherein

R¹ independently are monovalent $C_{1-15}$ hydrocarbon radicals, $C_{1-15}$ hydrocarbonoxy radicals or hydroxyl radicals, a is from 0 to 3, and b is from 0 to 3, with the proviso that at least one Si-bonded hydrogen is present on average per molecule, supported on a pulverulent organic or inorganic solid substrate having a BET surface area greater than 5 m²/g.

2. The gypsum plaster-containing composition of claim 1 wherein said pulverulent organic or inorganic solid substrate has a BET surface area of from 20 m²/g to 400 m²/g.

3. The gypsum plaster-containing composition of claim 1 wherein said pulverulent organic or inorganic solid substrate has a neutral to slightly acidic surface.

4. The gypsum plaster-containing composition of claim 1 wherein at least one pulverulent solid substrate comprises a pulverulent inorganic solid selected from the group consisting of silicon dioxide, aluminum oxide, titanium dioxide, silicates, and clays.

5. The gypsum plaster-containing composition of claim 1 wherein at least one pulverulent solid substrate comprises a pulverulent organic solid selected from the group consisting of starch powder, cellulose powder, or synthetic polymer powder.

6. The gypsum plaster-containing composition of claim 1 wherein R¹ is a $C_{1-6}$ alkyl radical or a phenyl radical.

7. The gypsum plaster-containing composition of claim 1 wherein a is on average from 0.01 to 2 and b is on average from 1.0 to 2.0.

8. The gypsum plaster-containing composition of claim 1 wherein not more than 5 mol percent of R¹ are hydrocarbonoxy radicals or hydroxyl radicals.

9. The gypsum plaster-containing composition of claim 1, wherein at least one organohydropolysiloxane has the formula $$(CH_3)SiO(SiHCH_3O)_y(Si(CH_3)_2O)_xSi(CH_3)_3$$

where x is 0 or an integer, y is an integer not less than 3, and y is at least three times x, and where x and y are such that said organohydropolysiloxane has a viscosity at 25° C. of not more than 1000 mm²/s.

10. The gypsum plaster-containing composition of claim 1, wherein said organohydropolysiloxane comprises from 20 to 75 percent by weight of said hydrophobicizing agent.

11. The gypsum plaster-containing composition of claim 1 which is selected from the group consisting of a gypsum mortar, a gypsum joint filler, a flowable screed, a jointing compound, and an adhesive mortar.

12. A process for producing hydrophobicized gypsum plaster-containing solid products selected from the group consisting of plasterboard and plaster moldings, said process comprising admixing the gypsum plaster-containing composition of claim 1 with water to form a settable aqueous plaster composition and allowing said composition to set to said solid plasterboard or plaster molding product.

* * * * *